United States Patent

Finger

[15] 3,704,432
[45] Nov. 28, 1972

[54] CAPACITIVE COULOMETER IMPROVEMENTS

[72] Inventor: Eugene P. Finger, Brewster, N.Y.

[73] Assignee: Curtis Instruments, Inc., Mount Kisco, N.Y.

[22] Filed: July 21, 1971

[21] Appl. No.: 164,676

[52] U.S. Cl. .................... 331/183, 324/94, 328/127, 332/56
[51] Int. Cl. ............................................. H03b 3/02
[58] Field of Search ........... 324/94; 328/127; 332/56; 331/183

[56] References Cited

UNITED STATES PATENTS 3,255,413   6/1966   Marwell et al. ............... 324/94

*Primary Examiner*—John Kominski
*Attorney*—Dean S. Edmonds et al.

[57] ABSTRACT

A generator utilizing a capacitive coulometer for generating a signal that is inversely proportional to the integral of a selected function. A current source and a variable amplitude interrogation oscillator are connected to the input terminals of a coulometer which modulates the output of the oscillator in accordance with the integral of the current from the current source. The modulated signal is amplified in an AC amplifier and demodulated by a standard envelope detector. The demodulated signal is compared with a reference signal in a differential amplifier which generates an error output signal when the demodulated signal is not equal to the reference signal. The error signal is fed back in a negative feedback path to adjust the amplitude of the variable amplitude interrogation oscillator.

7 Claims, 8 Drawing Figures

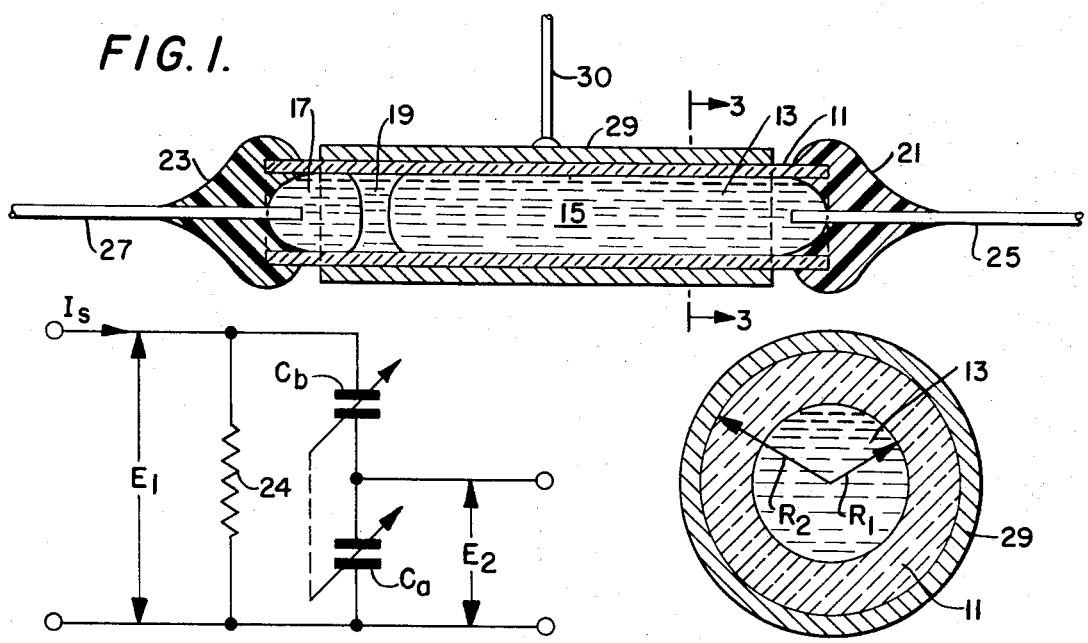
FIG. 1.
FIG. 2.
FIG. 3.
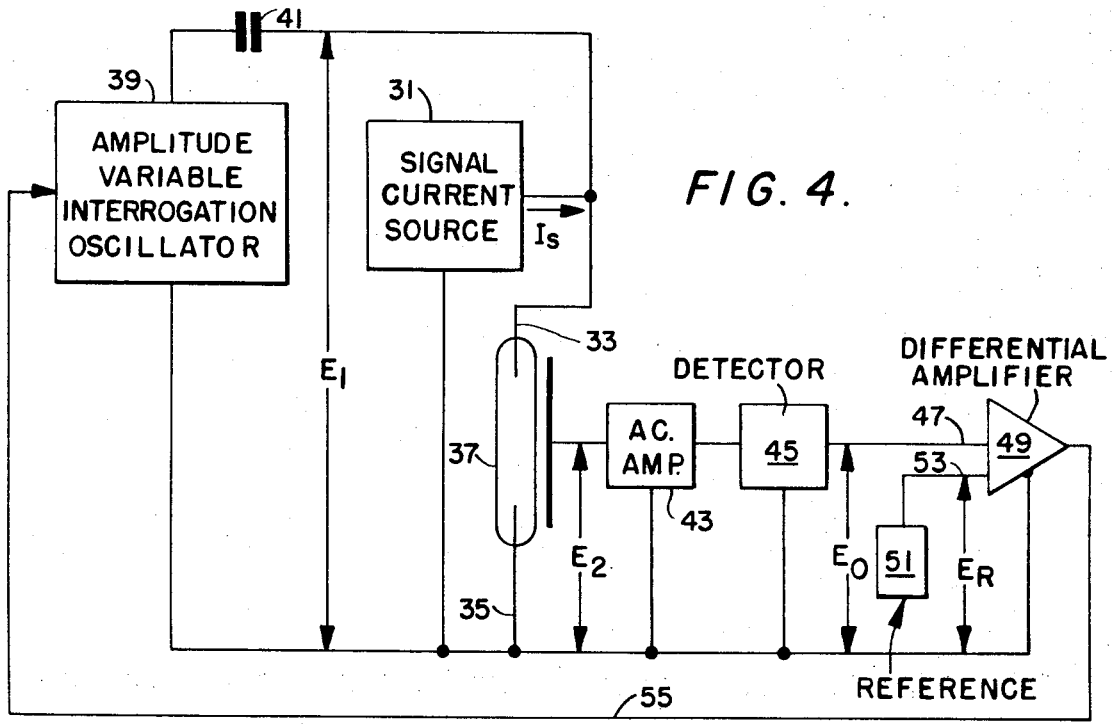
FIG. 4.
INVENTOR
EUGENE P. FINGER 3,704,432

CAPACITIVE COULOMETER IMPROVEMENTS

BACKGROUND OF THE INVENTION

This invention relates to a capacitive coulometer improvement for generating a signal that is inversely proportional to the integral of a selected signal.

In many measuring systems, such as those measuring the charge remaining in a battery or cell, the battery or cell being measured typically exhibits a reduced capacity with use. This reduction of capacity below the rated level introduces error in the measurement of the charge remaining since the charge remaining is typically derived by subtracting a value representing the charge dissipated from a value representing the total rated battery capacity. However, since the capacity of the battery typically decreases below the rated level with use, the results of the measurement are usually inaccurate. This error could be corrected if the value representing the rated capacity was correspondingly reduced with use. Thus, it is apparent that a means is required for generating a signal indicative of battery capacity that is inversely proportional to the amount of time the battery has been in use.

In other devices, such as, in learning systems, there is often a requirement for reduced exposure of a stimulus in accordance with the learning characteristics of the object of the stimulus, i.e., the perceiver. For example, if a stimulus is shown for the first time to a perceiver, it may take X units of time before the nature of the stimulus is understood by the perceiver. However, the second time the stimulus is shown, less time is required for the object to be understood and even less time is required for the third showing of the object. Typically, learning curves are inversely proportional to the previously accumulated exposure time. Thus, in electronically controlled learning systems, devices are required that control the exposure time of the stimulus so that it is exposed for shorter durations as the total exposure time increases. Circuits for accomplishing the aforementioned task have been exceedingly complex and expensive and, typically, have not been flexible enough to readily accommodate differing learning curves.

SHORT STATEMENT OF THE INVENTION

Accordingly, this invention relates to a circuit for generating a signal that is inversely proportional to the integral of a predetermined function. A current source for generating a predetermined waveform and a variable amplitude interrogation oscillator are connected to a means such as a coulometer for modulating the oscillator output in accordance with the integral of the current. The output of the coulometer is amplified and demodulated by an envelope detector, the output of which is compared with a reference voltage in a differential amplifier. If the demodulated output of the detector is different from that of the reference voltage, the resulting signal output of the differential amplifier is fed back to the interrogation oscillator along a negative feedback path to correspondingly correct the amplitude of the output of the oscillator.

BRIEF DESCRIPTION OF THE DRAWINGS

Other objects, advantages and features of this invention will become more fully apparent from the following detailed description, appended claims and accompanying drawings in which:

FIG. 1 is a simplified section view of the coulometer utilized in the invention.

FIG. 2 is an equivalent circuit of the coulometer illustrated in FIG. 1.

FIG. 3 shows a cross-sectional view of the coulometer of FIG. 1 taken along the lines 3—3 thereof.

FIG. 4 is a schematic diagram of the preferred embodiment of the invention.

DETAILED DESCRIPTION

Figure 5A:
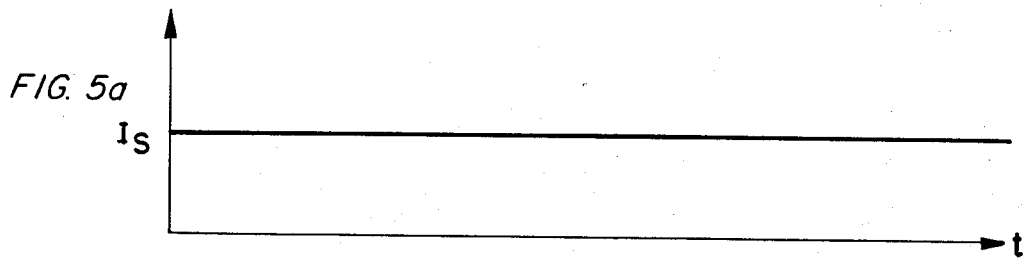
FIG. 5a is a graphical display of the output of the signal current source of the circuit of FIG. 1.

FIG. 1 shows a simplified section view of a coulometer such as utilized in the present invention and which is described in U.S. Pat. No. 3,255,413 issued to E. M. Marwell et al. A tube 11 comprised of non-conductive material such as glass, ceramics, epoxy resin or the like, has a capillary bore 13 into which is placed a pair of liquid metal columns 15 and 17. The columns which may be comprised of mercury extend inwardly from the opposite ends of the tube and are separated at their innermost ends by a small volume of an electrolyte 19 which is maintained in conductive contact with both columns. A suitable electrolyte may be a water solution of potassium iodide and mercuric iodide.

The bore 13 is sealed at both ends by epoxy resin seals 21 and 23 are illustrated. Electrical contact with the respective metal columns is provided by conductive leads 25 and 27, the innermost ends of which are immersed in the mercury columns. The conductive leads are preferably made of a metal such as nickel which does not chemically combine with the mercury in the bore.

A conductive sheath 29 is secured to the outer surface of tube 11 along substantially the full length thereof, and an electrically conductive lead 30 is connected thereto for conducting electrical signals with respect to the sheath 29. Conductive epoxy resin has been found to be a satisfactory sheath material, but it should be understood that any suitable electrical conductor disposed along the exterior surface of the body may be used as an alternative.

Refer now to FIG. 2 which shows a schematic diagram of the equivalent circuit of the coulometer illustrated in FIG. 1. The capacitance between mercury column 15 and sheath 29 is represented by a capacitor $C_a$ and the capacitance between column 17 and sheath 29 is represented by a capacitor $C_b$. As the capacitance of $C_a$ increases, the capacitance of $C_b$ decreases, and, as capacitance $C_a$ decreases, the capacitance of $C_b$ increases correspondingly. Thus, the capacitors are in a ganged differential form which is represented by the dotted line in the figure. Additionally, the coulometer has a small resistance provided mainly by the electrolyte 19. This resistance is represented by resistor 24 which is connected in parallel across the capacitors $C_a$ and $C_b$. It should be recognized that the coulometer instrument illustrated in FIG. 1 electrically functions as a capacitive potentiometer which when electrically energized with an AC voltage divides the voltage as a linear function of the value of the output capacitor $C_a$.

The transfer characteristic of the coulometer, that is, $E_2$ relative to the input current $I_s$, will now be developed. The displacement of the gap formed by the electrolyte 19 with respect to either end of the tube 11 is linearly related to the number of coulombs passing through the coulometer from lead 25 to lead 27. More specifically, a variable current $I_s$ maintained for a period of time T transfers $m$ grams of material, i.e., the liquid metal, having a molecular weight W and valence $\alpha$ through the electrolyte 19 in accordance with Faraday's Law. This may be represented by the following mathematical equation:

$$m = \frac{W}{\alpha F} \int_0^T I_s dt \qquad (1)$$

where F equals 96,494 coulombs. If, for example, liquid mercury having a density $\rho$ is transferred in the capillary bore 11 which has a diameter $d$, the gap displacement L, i.e., the length of a mercury column, can be computed as follows:

(volume of mercury in a column) $= m/\rho = \frac{1}{4} \pi d^2 L$ (2)

This may be transposed so that $$L = 4m/\rho \pi d^2 \qquad (3)$$

and, therefore, by substituting equation (3) into equation (1) the following formula is derived:

$$L = \frac{4W}{\rho \alpha \pi d^2 F} \int_0^T I_s dt = K_1 \int_0^T I_s dt \qquad (4)$$

where $K_1$ is a constant. It thus can be seen that the gap displacement L from either end of the tube 11 of the coulometer is proportional to the integral of the current passing through the coulometer.

Refer now to FIG. 3 which shows a cross sectional view of the coulometer of FIG. 1 taken along the line 3—3 thereof. The tube 11 is shown separating a conductive sheath 29 from the bore 13 which contains a liquid metal, such as, mercury. The bore 13 is shown having a radius $R_1$ and the conductive sheath is shown having a radius $R_2$. The capacitance between the conductive sheath 29 and the mercury in the bore 13 may be represented by the following well-known formula:

$$C = 0.241 \, E_r L / \log(R_2/R_1) \, Pf = K_2 L \, Pf \qquad (5)$$

where the gap displacement, i.e., the length of the mercury column, is L and $E_r$ is the relative capacitivity of the tube 11. It can be seen that the capacitance between the mercury column of the coulometer and the conductive sheath 29 is directly proportional to the displacement of the gap with respect to one of the ends of the coulometer. Accordingly, the capacitance between the mercury column and the outer sheath is proportional to a constant times the integral of the current passing through the coulometer. This may be represented as follows:

$$C = K_3 \int_0^T I_s dt \qquad (6)$$

The output transfer function of the coulometer integrator can now be developed. With reference to FIG. 2, the following formula represents the output transfer function:

$$E_2 = \frac{\frac{1}{SC_a}}{\frac{1}{SC_a} + \frac{1}{SC_b}} E_1 = \frac{C_b}{C_a + C_b} E_1 \qquad (7)$$

where S is the LaPlace operator. Since the total capacitance is always constant for a given coulometer, equation (7) may be simplified to $$E = (C_b/C_t) E_1 \qquad (8)$$

where $C_t$ is the total capacitance and is a constant. Thus, combining the above equation with equation (6) the output $E_2$ can be represented by $$E_2 = E_1 K_4 \int_0^T I_s dt \qquad (9)$$

It thus can be seen that the output $E_2$ of the coulometer is directly proportional to the integral with respect to time of the current passing through the coulometer multiplied by the voltage across the coulometer.

Refer now to FIG. 4 which shows a schematic diagram of the preferred embodiment of the invention. A signal current source 31 having a substantially infinite output impedance is connected to the input terminals 33 and 35 of a capacitive coulometer 37. The current signal source may be any suitable source, such as, for example, the sensed output of a battery or cell or a function representing the learning characteristics of a perceiver in a learning system. Accordingly, the output of the signal current source 31 may generally be described as a variable DC current. A high frequency, variable amplitude, interrogation oscillator 39 capable of generating frequencies from 1 KHz to 1 MHz is connected to the input of coulometer 37 through a blocking capacitor 41. The output of the interrogation oscillator 39 should preferably have a substantially zero output impedance so that the variable amplitude oscillator appears to the coulometer as a constant voltage source. The blocking capacitor 41 performs the function of preventing current from the signal current source 31 from feeding into the output of the oscillator 39 and should be made large so that the impedance which it presents to the AC signal is very small. The coulometer 37 amplitude modulates the AC signal from oscillator 39 in accordance with the integral of the current from source 31 in the manner previously discussed in connection with FIGS. 1-3.

The output of the coulometer is connected to an AC amplifier 43 for amplification. The amplified output signal from the coulometer is then demodulated by an envelope detector 45. Such demodulators are well-known and, therefore, will not be described in detail so that the invention may be more clearly and concisely described. The output from detector 45 is connected to the first input 47 of a differential amplifier 49. A constant voltage source 51 is connected to the other input 53 of the differential amplifier 49. If the demodulated signal input at terminal 47 is different from the reference voltage $E_R$ at terminal 53, an error signal is generated by the differential amplifier 49 which signal is fed back along a negative feedback path 55 to the variable amplitude interrogation oscillator 39. The error corrects the amplitude of the output of the interrogation oscillator 39 so that the error signal from the differential amplifier 49 is driven to zero.

Figure 5B:
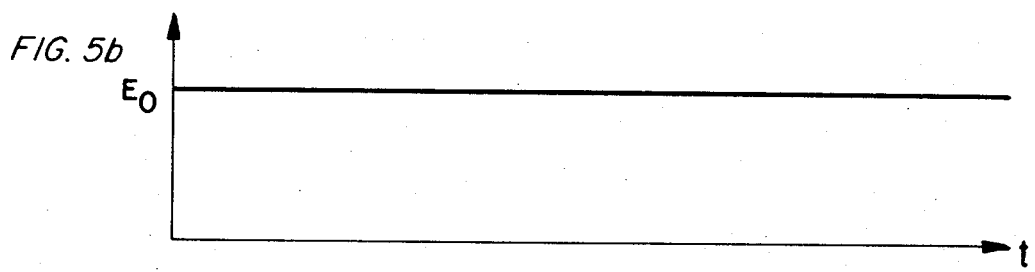
FIG. 5b is a graphical display of the demodulated output of the detector of FIG. 1.
Figure 5C:
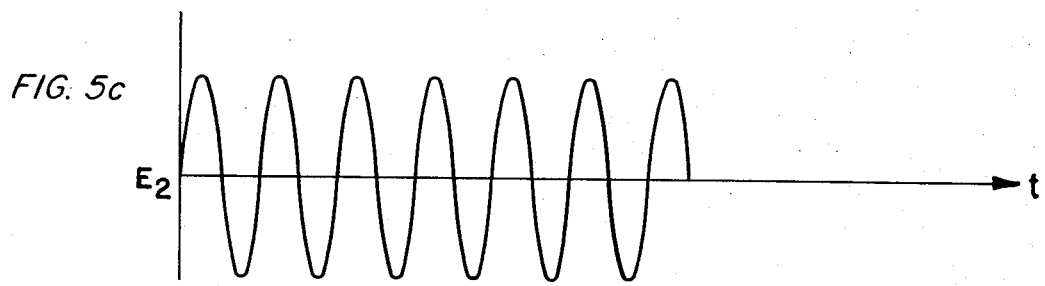
FIG. 5c is a graphical display of the output of the coulometer of FIG. 1.
Figure 5D:
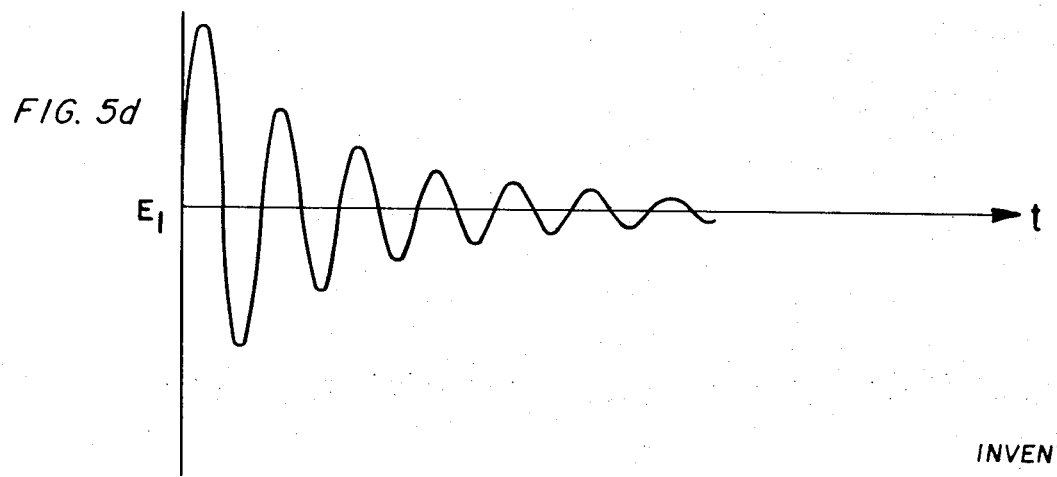
FIG. 5d is a graphical display of the output of the variable amplitude interrogation oscillator of FIG. 1.

Refer now to FIG. 5 which shows a graphical display of the waveforms associated with FIG. 4. FIG. 5(a) shows the output from signal current source 31 which, as shown, is a constant current. It should be understood that while a constant current output is shows any waveform suitable for a specific application may be utilized. FIG. 5(d) is a graphical display of the output of the variable amplitude interrogation oscillator 39 which is a sinusoidal signal having a constant frequency and an amplitude that decreases with respect to time as the inverse of a linear function, i.e., the inverse of the integral of the current from signal source 31. It should be understood that while a sinusoidal signal is shown as an output of the oscillator 39 any waveform may be utilized within the constraints that that ranges from 1 KHz to 1 MHz. FIG. 5(c) shows the output of the coulometer 37 which as shown is constant with respect to time in both frequency and amplitude. This is so despite the decreasing signal output of oscillator 39 since the output of the coulometer is the product of the integral of the current from signal source 31 which is a linearly rising function and the output of oscillator 39 which, as aforementioned, is inversely proportional to a linearly rising function. Accordingly, the time variable terms of the signals from current source 31 and oscillator 39 cancel, thereby producing an output having an amplitude that is constant with respect to time. FIG. 5(b) shows the demodulated output of the detector 45. It is constant with respect to time since the output of the coulometer 37 has a constant envelope.

It can be seen that the waveform of the output of the current source 31 determines the ultimate envelope of the output of variable amplitude interrogation oscillator 39. Thus, for example, if the output from the current source 31 varies linearly with time, the integral thereof will vary as a square with respect to time and consequently the output from interrogation oscillator 39 will be inversely proportional to a function that varies as a square with respect to time. Thus, depending upon the application of the aforementioned preferred embodiment, the output of the interrogation oscillator may be tailored to the use required.

The aforementioned description is of a capacitive coulometer improvement utilizing a variable amplitude interrogation oscillator in combination with a current source for generating a signal that is inversely proportional to the integral of the output of a current source. However, it should be apparent to one skilled in the art that certain modifications may be made within the spirit and scope of the invention as defined by the appended claims.

I claim:

1. A generator comprising a variable amplitude oscillator, means for generating a selected electrical function, means for modulating the output of said oscillator by the integral of said function, means for demodulating said modulated signal, said demodulated signal having an amplitude that is proportional to the envelope of the output of said oscillator multiplied by the integral of said function, and negative feedback means for adjusting the amplitude of the output of said oscillator when said demodulated signal is unequal to a preset reference voltage level.

2. The generator of claim 1 wherein said means for adjusting the amplitude of the output of said oscillator comprises a source of reference voltage, means for comparing said reference voltage with said demodulated signal, and means for connecting the output of said comparing means to said variable amplitude oscillator, said output of said comparing means controlling the amplitude of the output of said oscillator.

3. The generator of claim 2 wherein said means for modulating the output of said oscillator comprises a coulometer integrator.

4. The generator of claim 3 wherein said coulometer integrator comprises an output capacitance, means for varying said output capacitance in accordance with the integral of said electric function, means for electrically connecting the output of said variable amplitude oscillator to said coulometer, and means for detecting said oscillator output across said output capacitance.

5. The generator of claim 4 wherein said means for comparing said reference voltage with said demodulated signal is a differential amplifier.

6. A method of generating an electrical function having an amplitude that is inversely proportional to the integral of an electrical function comprising the steps of generating a selected electrical function, generating an AC signal having a controllable amplitude, modulating said AC signal with the integral of said function, demodulating said modulated signal, subtracting said demodulated signal from a reference potential, and adjusting the amplitude of said AC signal when said demodulated signal is unequal to said reference potential.

7. The method of claim 6 wherein said modulating step further comprises conducting said AC signal and said electrical function through a liquid metal column in a coulometer, varying the output capacitance of said coulometer in accordance with the integral of said electrical function, and detecting said AC signal across said output capacitance of said coulometer.

* * * * *